March 15, 1949.   P. W. GAENSSLE   2,464,680
BRAKE MECHANISM
Filed Aug. 10, 1945
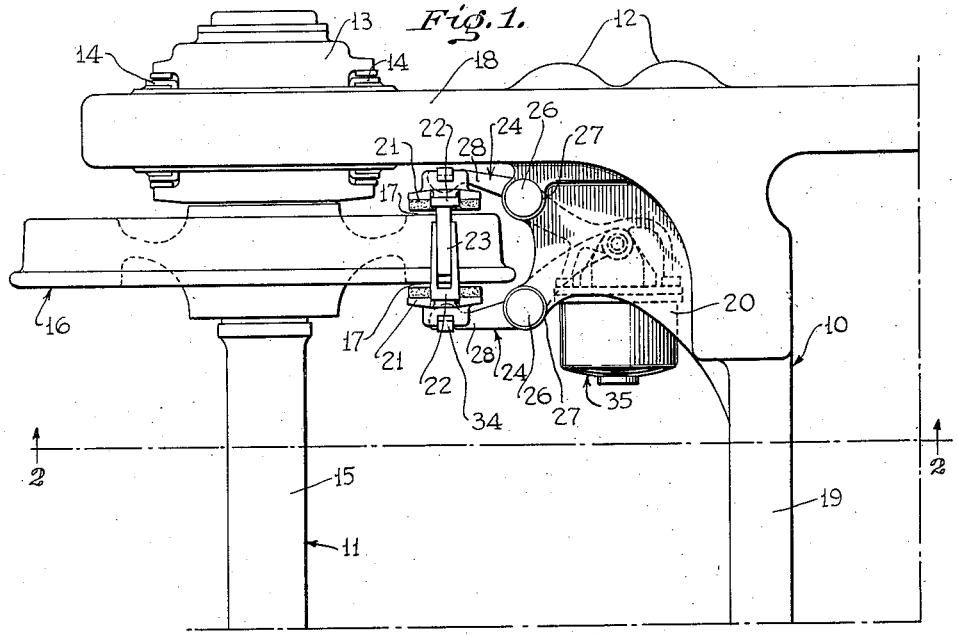
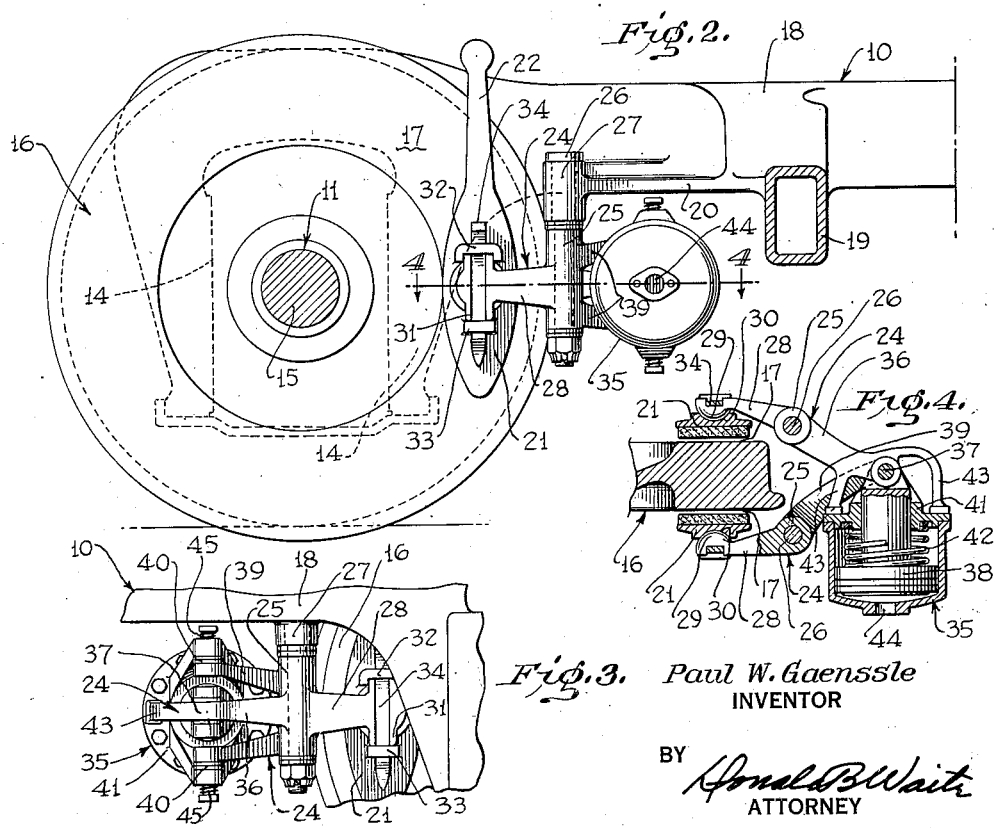
Paul W. Gaenssle
INVENTOR
BY Donald B Waite
ATTORNEY Patented Mar. 15, 1949

2,464,680

UNITED STATES PATENT OFFICE 2,464,680

BRAKE MECHANISM

Paul W. Gaenssle, Detroit, Mich., assignor to The Budd Company, Philadelphia, Pa., a corporation of Pennsylvania Application August 10, 1945, Serial No. 610,007

5 Claims. (Cl. 188—153)

The invention relates to a brake mechanism, and particularly to such a mechanism adapted for use in vehicles, such as railway trucks.

The invention is more particularly concerned with radial brakes applied to such vehicles.

Among its objects are the general simplification of the brakes, with a view to reduction in cost of manufacture and servicing, reduction in weight and particularly reduction in unsprung weight.

These and other objects and advantages and the manner in which they are attained will become apparent from the following detailed description when read in connection with the drawings forming a part of this specification.

In the drawings:

Figure 1 is a top plan view of one quarter of a railway truck to which the invention has been shown applied;

Figure 2 is a longitudinal sectional view taken substantially along the line 2—2 of Figure 1, with parts of the truck omitted;

Figure 3 is a fragmentary side elevational view of the brake mechanism and associated parts as seen from the outside of the truck, with parts of the truck omitted; and Figure 4 is a fragmentary horizontal sectional view taken substantially along the line 4—4 of Figure 2.

The truck to which the invention is shown applied is the usual passenger car type of truck, in which a frame, as generally represented by numeral 10, is carried at its opposite ends by wheel and axle assemblies, as 11, the frame being sprung in the usual manner, as indicated, by the spring seat bulges 12, Figure 1, from equalizers (not shown) having their ends resting in a usual manner upon the journal boxes, as 13, at the ends of the wheel and axle assemblies. The journal boxes are guided for relative vertical movement with respect to the truck frame 10 by the usual pedestal guides 14, 14.

Each wheel and axle assembly comprises an axle, as 15, the ends of which are rotatably mounted in the journal boxes, as 13, and wheels, as 16, one mounted adjacent each end of the axle.

In order to simplify the wheel and axle assembly and lighten its weight, no separate brake rotors are attached to the axle, but the wheels themselves are made to provide the radial braking faces of a brake rotor by providing widened radial braking faces 17, 17 on the opposite sides of the rims thereof. The wheel structure in this region has been shown diagrammatically as an integral structure and it will be understood that the braking faces may be of a different metal from that of the wheel proper and may be suitably secured thereto and provided with cooling passages, if desired.

The truck frame comprises the usual longitudinally extending side members, as 18, interconnected by spaced transoms, as 19, between which is suspended the usual bolster (not shown).

To lighten the overall structure and minimize the unsprung weight, the brake stators or brake shoes and their actuating means are carried wholly by the sprung frame 10. To this end the corner formed by the transom and side member adjacent a wheel is provided with a generally horizontally extending bracing web 20 extending closely adjacent the periphery of the adjacent wheel. This web not only additionally stiffens and strengthens the frame against distortion, but also serves as a means for mounting the brake shoes associated with the adjacent wheel and their actuating means.

The brake stators or shoes 21, 21 are of a generally elongated oval form and provided with a suitable brake lining disposed in position for engagement with the respective opposed braking faces 17, 17 on the wheel. This form of brake shoe insures the full engagement of the lining with the cooperating braking face, notwithstanding the rise and fall of the frame 10 under the varying loads to which it is subject.

As shown the shoes are each provided with vertical extensions 22, 22 beyond the shoes proper, these extensions being interconnected at the top, at some distance radially beyond the rim of the wheel, by transversely extending slidably interfitting aligning means, generally designated 23, for keeping the friction faces of the shoes aligned with each other and with the braking faces of the wheel.

The shoes 21, 21 are pivotally carried by brake levers, designated generally 24, 24. These levers are pivoted intermediate their ends through elongated hub portions 25, 25 on pivot pins 26, 26 headed at their upper ends and driven through openings in mounting bosses 27, 27 integral with the web 20 and disposed on opposite sides of the wheel plane. The levers 24, 24 are pivotally mounted through their hub portions on the reduced extensions of the pins projecting below the web 20 and are held in place by nuts threaded onto the screw threaded lower ends of the pins and secured in place by suitable locking means.

By this arrangement it will be seen that the levers are mounted entirely to one side of the web, namely, the lower side as shown, and can be readily dis-assembled by releasing the nuts and allowing them to drop off the pins.

The arms 28, 28 of the levers extending from their pivotal mounting toward the brake shoes are each provided adjacent their respective ends with a spherical boss 29, Figure 4, which fits a corresponding spherical seat 30 on the adjacent shoe. These ends of the arms having vertical enlargements 31, Figures 2 and 3, which fit between vertically spaced lugs 32 and 33 on the back of the adjacent shoe. To secure a shoe to its arm with the vertical enlargement 31 fitting between the lugs 32 and 33 and the spherical boss fitting the spherical seat in the shoe, a quick detachable key 34 is provided, which may be a flat spring and is passed down to locking position through aligned apertures in the lugs 32 and 33 with its central portion bearing yieldingly against the back of the shoe. Thus the shoe is held securely in place against rattling and can be very readily demounted by merely withdrawing the key.

This universal mounting of the shoe is desirable to permit it to follow the movements of the braking faces on the wheel and thus apply uniform bearing pressure thereon, irrespective of the relative tilting movements of the frame and the wheel and axle assembly in vertical and horizontal planes. Since there usually exists some looseness and play in the pedestal guides, the axle may tilt slightly with respect to the frame in a horizontal plane and similarly the axle may tilt transversely with respect to the frame in a vertical plane.

The brake levers 24, 24 have their arms extending from the opposite sides of their pivots connected to a floating single piston cylinder actuator generally designated 35. To provide for compactness of arrangement and accessibility, the cylinder actuator is disposed wholly on one side of said arms which are so designed as to swing across each other when viewed in plan. As shown, the outboard lever 24 has an arm 36 pivoted at 37 to the protruding end of the rod of piston 38 of the actuator and the inboard lever 24 has a bifurcated arm 39 straddling the arm 36 of the outboard lever and pivotally connected at top and bottom at 40, 40, Figure 3, to the cylinder head 41 through which the rod of the piston projects. The pivots 40, 40 are shown in Figure 3 as having anti-rattle springs 45, 45 associated therewith. A spring 42, Figure 4, between the piston and the cylinder head 41 normally biases the parts to the inoperative position shown in Figure 4. To hold the parts stationary when in the inoperative position and prevent engagement of the shoes with the braking faces of the wheel or swinging of the cylinder and piston actuator from side to side, the arm 36 of the outboard lever 24 is provided on opposite sides of its pivotal connection 37 to the piston with stop arms 43, 43 which are, through the action of the spring 42, pressed firmly against the cylinder head 41 to hold the parts immovable in the position shown in Figure 4.

The inboard end of the cylinder is provided with a usual port 44 to which a nipple and conduit may be suitably attached for admitting compressed fluid behind the piston to move the piston and cylinder relative to each other and thereby apply the brakes.

While a specific embodiment of the invention has been described herein, it will be understood that changes and modifications may be made by those skilled in the art without departing from the main features of the invention and such changes and modifications are intended to be covered by the appended claims.

What is claimed is:

1. In a brake mechanism for vehicles, a brake rotor having radial braking faces on the opposite sides thereof, brake stators arranged in cooperative relation with the respective braking faces of said rotor, brake levers pivotally mounted intermediate their ends and having arms extending in opposite directions from their respective pivots, the arms extending in one direction carrying the respective shoes, and the arms extending in the opposite direction carrying a floating single piston cylinder actuator, one of said last-named arms being pivotally connected to the piston and the other being pivotally connected to the cylinder of said actuator, and one of said arms being bifurcated and arranged to receive the other arm between the furcations thereof, the one of said last-named arms connected to the piston carrying stop means engaging the cylinder and cooperating with a return spring to hold the parts in inoperative position.

2. In a brake mechanism for vehicles, a brake rotor having radial braking faces on the opposite sides thereof, brake stators arranged in cooperative relation with the respective breaking faces of said rotor, brake levers pivotally mounted intermediate their ends and having arms extending in opposite directions from their respective pivots, the arms extending in one direction carrying the respective shoes, and the arms extending in the opposite direction carrying a floating single piston cylinder actuator spring-biased to inoperative position, one of said last-named arms being pivotally connected to the piston and the other to the cylinder of said actuator, one of said arms being provided with stop means for engagement with one of said piston and cylinder when the parts are biased to inoperative position by the spring to hold them stationary in said position.

3. In a brake mechanism for vehicles, a wheel and axle assembly comprising a rotor having radial braking faces on its opposite sides, a vehicle frame supported from said assembly and having a longitudinally extending side member and a transon connected thereto, a web bracing the corner between said side member and said transom and having a portion extending closely adjacent the periphery of said rotor, and brake parts supported from said web comprising brake levers having pivotal support directly on said portion of the web and disposed at one side of said web, said levers carrying brake shoes connected for limited universal movement with respect thereto and disposed respectively in cooperative relation with the opposite radial braking faces of said rotor and a cylinder actuator floatingly supported between and by the opposite ends of said levers from said shoes.

4. In a brake mechanism for vehicles, a wheel and axle assembly comprising a rotor having radial braking faces on its opposite sides, a vehicle frame supported from said assembly and having a longitudinally extending side member and a transom connected thereto, a substantially horizontal web bracing the corner between said side member and said transom and extending adjacent the periphery of said rotor, and brake parts supported from said web comprising brake levers having pivotal support directly on said web and disposed at one side thereof, said levers carrying brake shoes at one of their ends for cooperation with the respective opposite radial braking faces of said rotor and a floating single piston brake actuating cylinder pivotally carried by the levers, and disposed wholly at one side of their ends remote from the ends thereof supporting the shoes.

5. In a brake mechanism for vehicles, a wheel and axle assembly carrying a brake rotor having a radial braking face thereon, a brake shoe arranged in cooperative relation to said braking face, a vehicle frame supported from said wheel and axle assembly and having relative tilting movement with respect thereto in both horizontal and vertical planes, a lever pivoted directly on said frame, the shoe having a spherical seat, and the lever having a corresponding boss fitting said seat, and quick detachable means comprising a resilient key for securing said shoe to the lever with said boss and seat in interfitting relation.

PAUL W. GAENSSLE.

REFERENCES CITED

The following references are of record in the file of this patent:

UNITED STATES PATENTS

| Number | Name | Date |
|---|---|---|
| 2,293,975 | Eksergian | Aug. 25, 1942 |
| 2,343,342 | Tack | Mar. 7, 1944 |
| 2,357,263 | Ledwinka | Aug. 29, 1944 |
| 2,365,369 | Williams | Dec. 19, 1944 |